(12) United States Patent
Wang et al.

(10) Patent No.: US 9,924,426 B2
(45) Date of Patent: Mar. 20, 2018

(54) APPARATUS, COMPUTER PROGRAM, AND METHOD FOR CRITERIA-BASED CONDITIONAL CELL RESELECTION

(71) Applicant: Futurewei Technologies, Inc., Plano, TX (US)

(72) Inventors: Julia Wang, San Diego, CA (US); Limei Wang, San Diego, CA (US); Mark Ernest Newbury, Hillsborough, NJ (US); SaiRamesh Nammi, Bedminster, NJ (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 15/174,890

(22) Filed: Jun. 6, 2016

(65) Prior Publication Data

US 2017/0353897 A1    Dec. 7, 2017

(51) Int. Cl.
*H04W 36/08* (2009.01)
*H04W 36/30* (2009.01)
*H04W 36/32* (2009.01)

(52) U.S. Cl.
CPC .......... *H04W 36/08* (2013.01); *H04W 36/30* (2013.01); *H04W 36/32* (2013.01)

(58) Field of Classification Search
CPC ...... H04W 36/08; H04W 36/30; H04W 36/32
USPC ................................. 455/436–444
See application file for complete search history.

(56) References Cited

U.S. PATENT DOCUMENTS

| 7,480,519 | B2 | 1/2009 | Jeong et al. |
| 8,831,599 | B2 | 9/2014 | Kuru et al. |
| 2006/0258386 | A1 | 11/2006 | Jeong et al. |
| 2009/0247167 | A1* | 10/2009 | Higashide ............. H04W 28/08 455/436 |
| 2010/0222055 | A1* | 9/2010 | Cho ...................... H04J 11/0086 455/434 |
| 2012/0250548 | A1 | 10/2012 | Swaminathan et al. |
| 2013/0153298 | A1* | 6/2013 | Pietraski ................. H04L 5/001 175/45 |
| 2014/0242993 | A1* | 8/2014 | Dahlen ................. H04W 36/30 455/436 |
| 2014/0342740 | A1* | 11/2014 | Kim ...................... H04W 36/14 455/437 |

(Continued)

FOREIGN PATENT DOCUMENTS

| CN | 101998555 A | 3/2011 |
| CN | 102595522 A | 7/2012 |
| WO | 2014101184 A1 | 7/2014 |

OTHER PUBLICATIONS

International Search Report for PCT Application No. PCT/CN2017/087283, dated Aug. 25, 2017.

*Primary Examiner* — Marisol Figueroa

(74) *Attorney, Agent, or Firm* — Zilka-Kotab, PC

(57) ABSTRACT

An apparatus, computer program, and method are provided for criteria-based conditional cell reselection. In operation, information is identified in connection with a mobile communication device being serviced by a first cell of a network utilizing a first frequency with a first priority. A determination is then made as to whether the information meets one or more criteria. Based on such determination, reselection is conditionally caused for the mobile communication device in connection with a second cell of the network utilizing a second frequency with a second priority.

22 Claims, 12 Drawing Sheets

(56) References Cited

U.S. PATENT DOCUMENTS

| | | | |
|---|---|---|---|
| 2015/0036663 A1* | 2/2015 | Kilpatrick, II | H04W 36/0083 370/332 |
| 2015/0141020 A1* | 5/2015 | Bengtsson | H04W 48/20 455/440 |
| 2016/0057668 A1* | 2/2016 | Lee | H04W 48/20 370/331 |

* cited by examiner

APPARATUS, COMPUTER PROGRAM, AND METHOD FOR CRITERIA-BASED CONDITIONAL CELL RESELECTION

FIELD OF THE INVENTION

The present invention relates to networking, and more particularly to reselection in a network.

BACKGROUND

In networks such as 4G/LTE/LTE-A cellular networks, a mobile communication device switches from an idle mode state to a connected mode state when a voice call or data communication (e.g. uplink, downlink, etc.) is required. After such data communication is completed, the mobile communication device then switches back to the idle mode state from the connected mode state. Typically, a serving cell of a stationary mobile communication device does not change as a result of any switch from the idle mode state to the connected mode state.

However, in certain scenarios when the stationary mobile communication device is located in an area covered by multiple cells, the mobile communication device performs a handover from a first cell (e.g. with a higher frequency priority, and lower received signal power/quality) to a second cell (e.g. with a lower frequency priority, and higher received signal power/quality) for a data connection or a voice call. Once the call has ended or data communication is complete, the mobile communication device performs cell reselection from the second cell back to the first cell. Under certain circumstances, this "ping-pong" reselection/handover loop between the cells can potentially be repeated an inordinate number of times.

Specifically, as mobile communication devices utilize more and more applications (e.g. e-mail, web-browsers, instant message applications, social networking applications, etc.) that require intermittent data communications, the rate at which mobile communication devices switch between idle and connected mode states (which, in turn, cause associated handovers/reselections) increases dramatically. Further, in order to initiate a handover, a variety of cell measurements, reports, and commands are required; while a reselection requires cell measurements, as well. To this end, network overhead, mobile communication device power consumption, etc. can be become overly burdensome, as mobile communication devices are required to repeatedly switch between cells via handovers/reselections. This can, in turn, result in reduced quality of service on the part of the network, and limited battery life on the part of the mobile communication device.

SUMMARY

An apparatus, computer program, and method are provided for criteria-based conditional cell reselection. In operation, information is identified in connection with a mobile communication device being serviced by a first cell of a network utilizing a first frequency with a first priority. A determination is then made as to whether the information meets one or more criteria. Based on such determination, reselection is conditionally caused for the mobile communication device in connection with a second cell of the network utilizing a second frequency with a second priority.

In a first embodiment, the information may be associated with a speed of the mobile communication device. Further, the one or more criteria may involve a speed-related threshold, and the determination may determine whether the information exceeds the speed-related threshold.

In a second embodiment (which may or may not be combined with the first embodiment), the information may be associated with at least one of a reference signal received power (RSRP) or a reference signal received quality (RSRQ). Further, the information associated with at least one of the RSRP or the RSRQ may be in connection with the first cell of the network, and/or the second cell of the network. Still yet, the one or more criteria may involve a configurable threshold, and the determination may determine whether the information crosses the configurable threshold. Even still, the one or more criteria may involve at least one of a RSRP threshold or a RSRQ threshold, and the determination may determine whether the information crosses the at least one of the RSRP threshold or the RSRQ threshold. Even further still, the determination may involve a comparison between at least one of the RSRP or the RSRQ in connection with the first cell of the network, and at least one of the RSRP or the RSRQ in connection with the second cell of the network. Also, the one or more criteria may involve a threshold, and the determination may determine whether the information crosses the threshold for a minimum amount of time. In different aspects of the present embodiment, the one or more criteria may be configured by the mobile communication device and/or the network.

In a third embodiment (which may or may not be combined with the first and/or second embodiments), the reselection may be conditionally caused, utilizing a particular technique. For example, the particular technique may involve changing at least one of the first priority of the first frequency or the second priority of the second frequency, based on the determination. Further, the particular technique may involve adjusting at least one parameter that controls whether the reselection is conditionally caused. Still yet, the particular technique may involve adding the second frequency utilized by the second cell to a non-reselection list. As an option, an effect of the particular technique may also be reversed. Further, the reselection may be caused by at least one of the mobile communication device, or the network.

To this end, in some optional embodiments, one or more of the foregoing features of the aforementioned apparatus, computer program, and/or method may conserve resources on part of the network (in the form of network signaling overhead) and/or on part of the mobile communication device (in the form of battery power). Specifically, this may be accomplished utilizing priority-agnostic/quality-centric logic to dictate whether reselection occurs on a more selective basis, instead of simply progressing with reselection based only on the priority of cells each time the mobile communication device switches from a connected mode state to an idle mode state. To this end, the aforementioned resources are conserved, by avoiding the typically required cell measurements, reports, and commands that are otherwise required to effect cell reselection. It should be noted that the aforementioned potential advantages are set forth for illustrative purposes only and should not be construed as limiting in any manner.

DETAILED DESCRIPTION

Figure 1A:
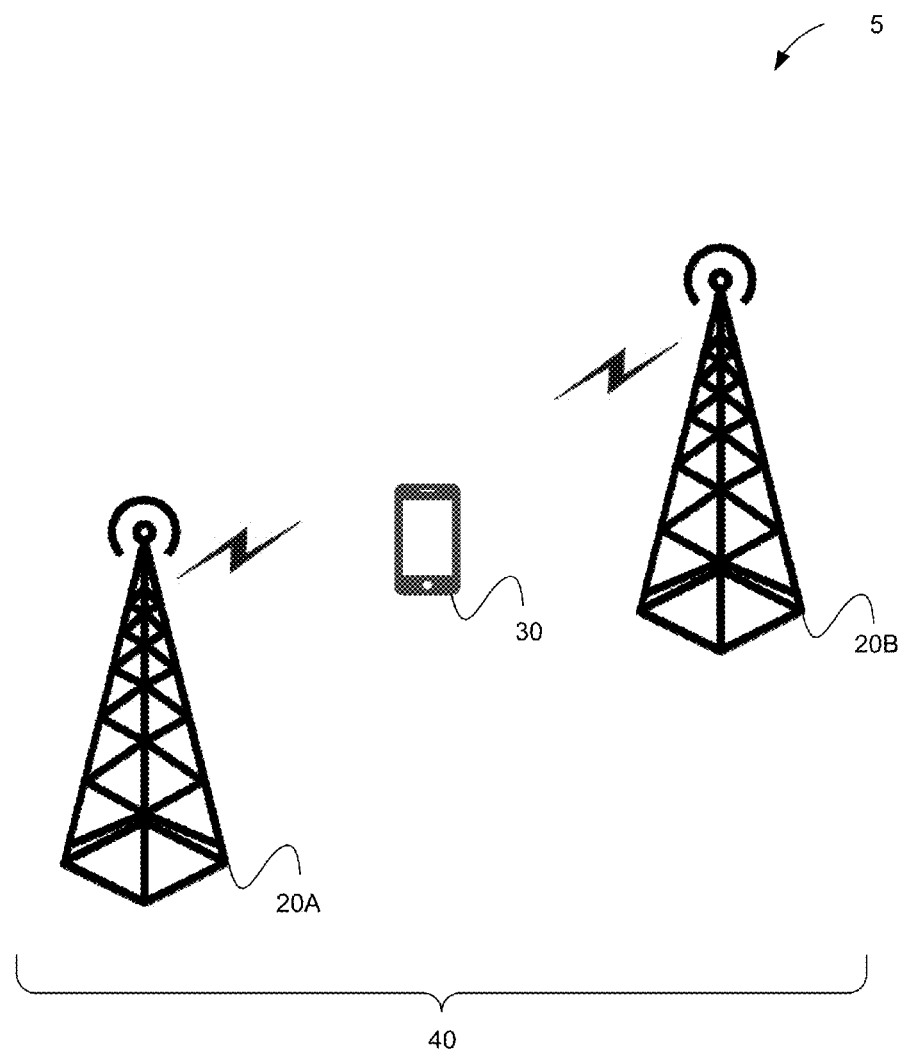
FIG. 1A illustrates a system for criteria-based conditional cell reselection among a plurality of cells in connection with a mobile communication device on a network, in accordance with one embodiment.

FIG. 1A illustrates a system 5 for criteria-based conditional cell reselection among a plurality of cells 20A, 20B in connection with a mobile communication device 30 on a network 40, in accordance with one embodiment. As shown, the plurality of cells 20A, 20B are components of the network 40 that, in turn, are capable of serving the mobile communication device 30.

In various embodiments, the network 40 may include any network where the mobile communication device 30 is capable of being served by different cells (e.g. cells 20A, 20B, etc.) utilizing different frequencies. For example, such network may include a 4G/LTE/LTE-Advanced network and/or any other advancement/permutation thereof. Further, non-limiting examples of the foregoing cells 20A, 20B may include a Node B, base station (BS), multi-standard radio (MSR) radio node such as an MSR BS, eNode B, network controller, radio network controller (RNC), base station controller (BSC), relay, donor node controlling relay, base transceiver station (BTS), access point (AP), transmission point, transmission nodes, remote radio unit (RRU), remote radio head (RRH), node in a distributed antenna system (DAS), and/or any other cell that is configured for communicating with the mobile communication device 30 over the network 40.

It should be noted, however, that use of other radio access technology (RAT) networks (e.g. BLUETOOTH, WiFi, etc.) are contemplated, as well. Further, the mobile communication device 30 (or simply "mobile device") may, in various embodiments, include a phone, a tablet, a laptop, a vehicle, any desired type of user equipment (UE), and/or any other type of device capable of communicating on the aforementioned network 40 or any other type of network, for that matter.

Figure 1B:
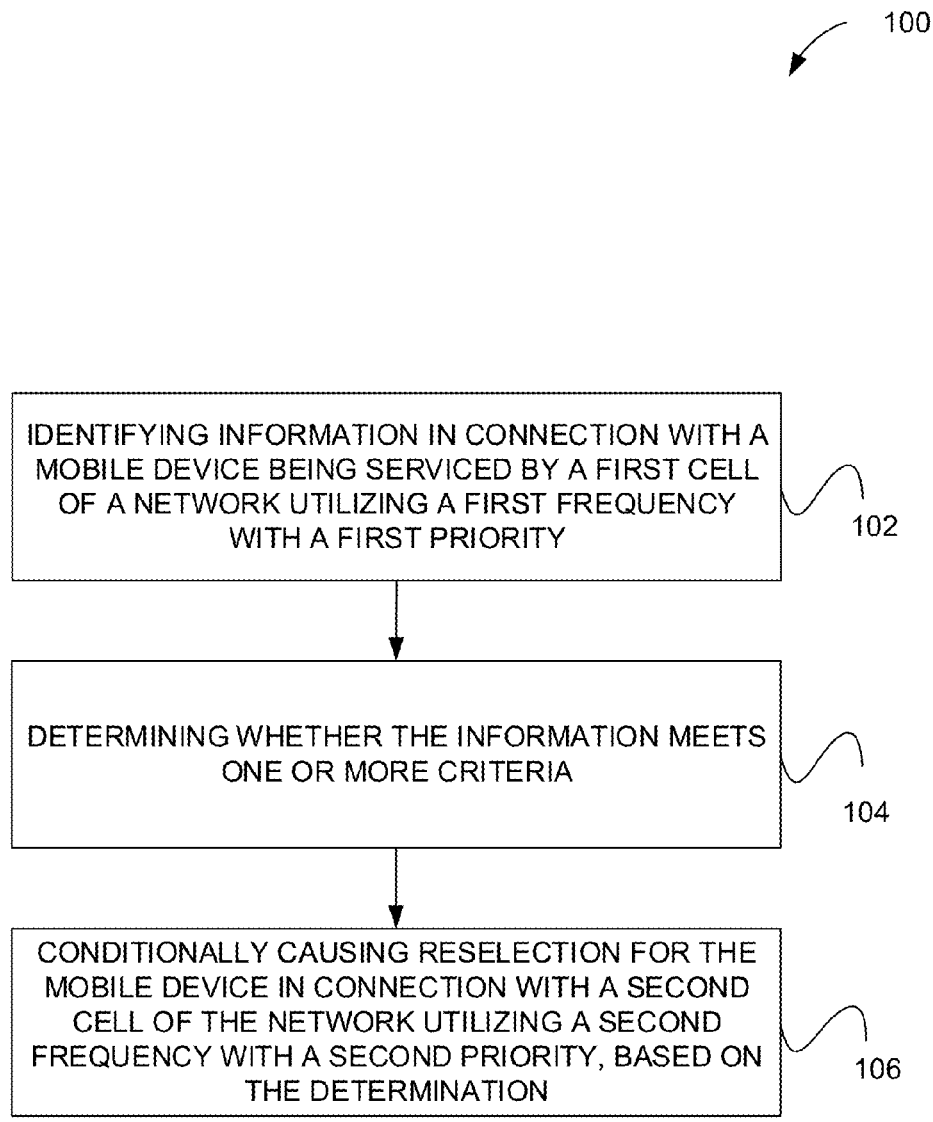
FIG. 1B illustrates a method for criteria-based conditional cell reselection in connection with a mobile communication device on a network, in accordance with one embodiment.

FIG. 1B illustrates a method 100 for criteria-based conditional cell reselection in connection with a mobile communication device on a network, in accordance with one embodiment. As an option, the method 100 may be implemented with any feature(s) of any one or more of the embodiments set forth in any previous and/or subsequent figure(s) and/or the description thereof. For example, the method 100 may, in one embodiment, be implemented in the context of the system 5 of FIG. 1A. However, it is to be appreciated that the method 100 may be implemented in the context of any desired environment.

In step 102, information is identified in connection with the mobile communication device that is being serviced by a first cell of the network utilizing a first frequency with a first priority. Such information may include any data on which a decision whether to cause a reselection may be based. For example, in various embodiments that will be described later in greater detail, the information may be associated with a speed of the mobile communication device, a reference signal received power (RSRP), and/or a reference signal received quality (RSRQ). Such RSRP and RSRQ may be associated with either the first cell or a second cell. It should also be noted that the aforementioned information may explicitly include the foregoing data and/or be derived/inferred therefrom (e.g. via additional processing, etc.).

Further, the information may be sourced directly from the mobile communication device, received by the mobile communication device from the network, and/or identified in any other desired manner that allows for its use. For example, in one embodiment, the speed may be identified utilizing a global positioning system (GPS) or accelerometer of the mobile communication device, and/or using triangulation or another position/speed-identifying technique on the part of the network. Still yet, the RSRP and/or RSRQ may be included in periodic measurement reports generated by the mobile communication device (e.g. using a power/quality detector, etc.) and communicated between the mobile communication device and one or more cells, in accordance with a standard-based communication protocol (e.g. 4G/LTE/LTE-Advanced network and/or any other advancement/permutation thereof, etc.).

In the context of the present description, the aforementioned RSRP is an average (e.g. linear average, etc.) of reference signals across a channel bandwidth. Further, the RSRQ indicates a quality of a reference signal. For example, in one embodiment, the RSRQ may be based on the aforementioned RSRP, and a received signal strength indicator (RSSI) that represents a received wide-band power by the mobile communication device. Equation #1 below includes a sample calculation that may be used to calculate RSRQ, where N represents a number of resource blocks. It is contemplated that the calculation of the RSRP and/or RSRQ may deviate as required by relevant standard(s).

$$RSRQ = \frac{RSRP}{RSSI} * N \quad \text{Equation \#1}$$

As indicated in step 104, it is then determined whether the information meets one or more criteria. In various embodiments, such determination may be made by the mobile communication device, the network, and/or any other entity, for that matter. Further, in the context of the present description, the one or more criteria may include a threshold, rule, logic, and/or anything else that is capable of being applied to the information for the purposes of basing a reselection decision upon. In different embodiments, the criteria may be configured by the mobile communication device, the network, and/or any other entity, for that matter.

For example, in one embodiment where the information is associated with mobile communication device speed, the criteria may involve a speed-related threshold, and the determination may determine whether the information (e.g. speed, etc.) of the mobile communication device exceeds the speed-related threshold. In such embodiment, the speed-related threshold may include any predetermined velocity (including zero velocity). Thus, in one embodiment, the speed-related threshold may be used to test whether the mobile communication device is stationary or near stationary.

Further, in another embodiment where the information is associated with the RSRP and/or RSRQ, the criteria may involve a RSRP threshold and/or a RSRQ threshold, respectively, and the determination may determine whether the information (e.g. RSRP, RSRQ, etc.) crosses the RSRP threshold and/or the RSRQ threshold, respectively. As mentioned earlier, such RSRP and RSRQ may be associated with either the first cell or the second cell. In still another related embodiment, the criteria may involve a configurable threshold, and the determination may determine whether the information crosses the configurable threshold. It should be noted that any of the previous criteria (and/or any other criteria disclosed herein) may or may not be combined, as desired in various ways; for example, the criteria could involve the determination of whether the difference between RSRP/RSRQ crosses a configurable threshold. More information regarding various possible combinations of specific criteria will be set forth hereinafter during the description of subsequent figures.

In different embodiments, the aforementioned thresholds may be configured by the mobile communication device, the network, and/or any other entity, for that matter. Still yet, in any of the foregoing embodiments, the criteria may be configured to be a function of time. For instance, the determination may determine whether the information crosses a particular threshold for a minimum amount of time.

To this end, in step 106, reselection is conditionally caused for the mobile communication device in connection with the second cell of the network utilizing a second frequency with a second priority, based on the determination of step 104. In the context of the present description, the first and second priorities may refer to any prioritization associated with the first and second frequencies, respectively, that dictate which frequency is utilized during operation. For example, in one optional embodiment, the priorities may be assigned by a network service provider using any desired technique, for supporting reselection. Further, such priorities may be communicated to the mobile communication device for use during reselection.

Also in the context of the present description, reselection may refer to any process by which the mobile communication device switches between the first cell and the second cell, while the mobile is in an idle mode state (which includes any state in which data transfer is less than a connected mode state). Further, in various embodiments, the reselection may be caused by the mobile communication device (e.g. via a modem therein with configured protocol logic, etc.), the network, or by the two acting together in various ways. For example, in one embodiment, reselection may be autonomously caused by the mobile communication device according to reselection criteria based on: 1) parameters broadcast in system information blocks (SIBs) from the network, and 2) serving/neighbor cell measurement results from the mobile communication device. It should also be noted that, in the context of an embodiment where reselection occurs in a repeated manner, the abovementioned conditional causation may result in one or more of the reselections being avoided.

In various embodiments, the reselection may be conditionally caused, utilizing any one or more particular techniques. For example, in one embodiment, the particular technique may involve changing the priority of the first frequency of the cell of the network and/or the priority of the second frequency of the cell of the network, based on the determination. In another embodiment, the particular techniques may involve adjusting at least one parameter that controls whether the reselection is conditionally caused. In still another embodiment, the particular techniques may involve adding a frequency to a non-reselection list, based on the determination. For example, in various possible embodiments, the first frequency of the cell and/or the second frequency of the cell may be added to a non-reselection list.

More illustrative information will now be set forth regarding various optional architectures and uses in which the foregoing method may or may not be implemented, per the desires of the user. For example, in one embodiment, an effect of the relevant particular technique may be reversed, based on a speed of the mobile communication device and/or any other defined condition/criteria. It should be noted that the following information is set forth for illustrative purposes and should not be construed as limiting in any manner. Any of the following features may be optionally incorporated with or without the exclusion of other features described.

Figure 2:
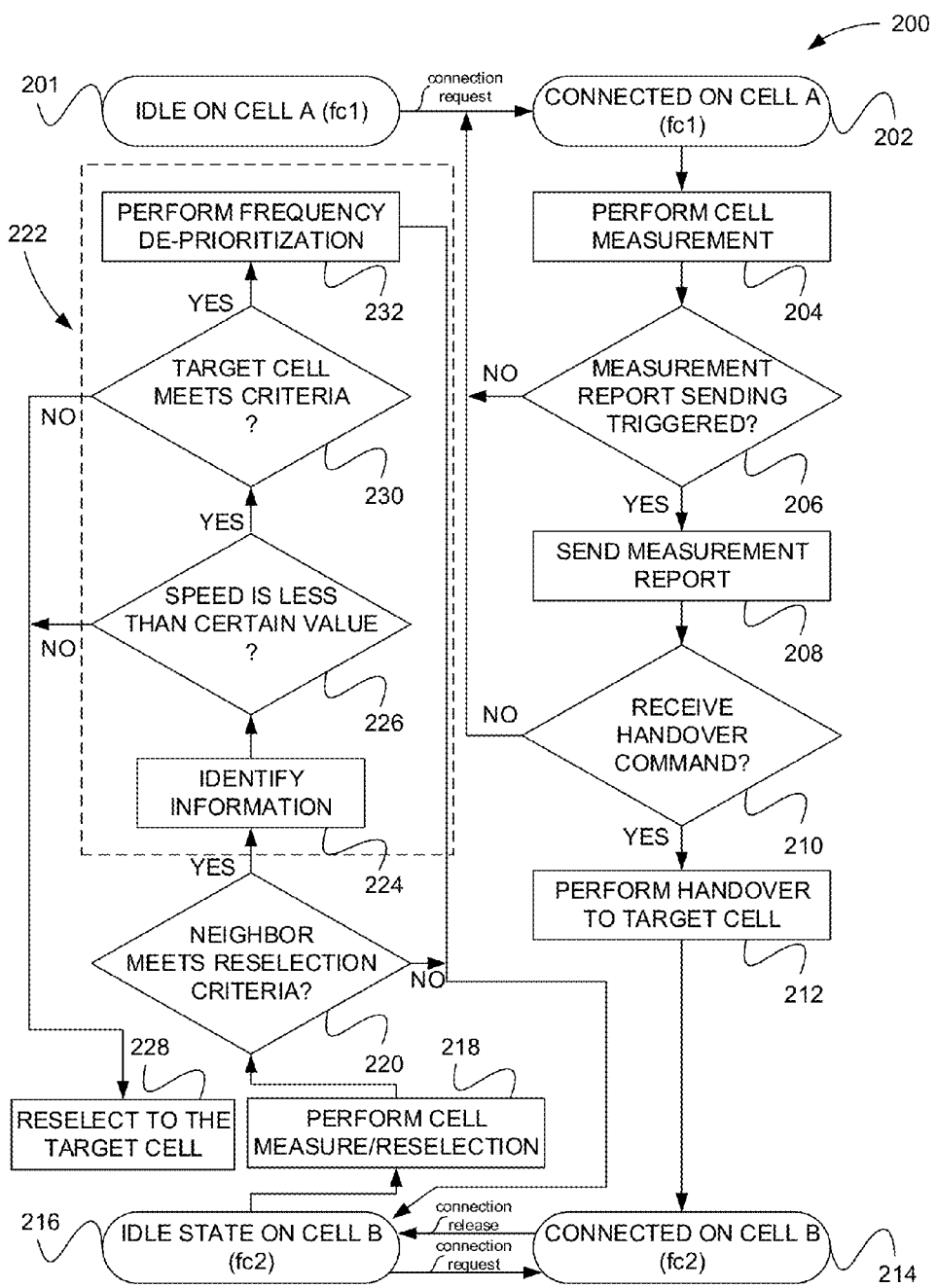
FIG. 2 illustrates a method for criteria-based conditional cell reselection to a cell on a higher priority frequency utilizing a first particular technique, in accordance with another embodiment.

FIG. 2 illustrates a method 200 for criteria-based conditional cell reselection to a cell on a higher priority frequency utilizing a first particular technique, in accordance with another embodiment. As an option, the method 200 may be implemented with any feature(s) of any one or more of the embodiments set forth in any previous and/or subsequent figure(s) and/or the description thereof. However, it is to be appreciated that the method 200 may be implemented in the context of any desired environment.

As shown in step 201, the method 200 begins with a mobile communication device in an idle mode state that is being serviced by a first cell that is operating on a first frequency with a first priority assignment. In response to a connection request initiated by the mobile communication device (that may result from a need to transmit and/or receive data), the mobile communication device switches to a connected mode state and continues to be serviced by the first cell with the first frequency. See step 202.

Cell measurements are performed in step 204. Such cell measurements involve the receipt of reference signals from one or more other cells and generating measurement information in the form of RSRP and/or RSRQ information. Further, such measurement information is then reported in step 208 based on a decision 206 that is a function of appropriate control signaling protocol.

The method 200 then continues by awaiting a handover command that is sent by the network, per decision 210. Such handover command may be issued as a function of the measurement information that was previously reported in step 208, among other factors. Upon receipt of the handover command, the handover is effected to a second cell operating on a second frequency with a second priority assignment, but with higher signal power/quality. See step 214.

As a result, the mobile communication device is then established in a connected mode state that is serviced by the second cell, as indicated by step 214. Further, any data may be communicated, as necessary. When data communication has ended, a connection release command is issued by the mobile communication device that results in the mobile communication device entering an idle mode state, but still being serviced by the second cell. See step 216.

Initiation of the idle mode state in step 216 then causes a reselection procedure to begin in step 218, by performing cell measurements similar to those in step 204. Instead of sending a report, however, the mobile communication device itself determines whether any neighboring meets reselection criteria. See decision 220. In one embodiment, such reselection criteria may involve the identification of another target cell (e.g. the first cell or some other similar cell, etc.) that has a higher priority assignment and is thus suitable for serving the mobile communication device while in the idle mode state.

Instead of simply reselecting to the target cell, a particular technique 222 is carried out to avoid the reselection under certain circumstances. Specifically, information is identified in step 224. Such information may include a speed of the mobile communication device, RSRP/RSRQ information, various criteria (that will be described hereinafter in greater detail), etc., for evaluating whether reselection avoidance is warranted.

Next, it is determined whether the speed identified in decision 226 is less than a certain value. Specifically, decision 226 determines whether the mobile communication device is stationary or is moving at a low enough speed to allow for the reselection to be avoided. If the speed is not less than the certain value, reselection is carried out to the target cell, per step 228.

If it is determined that the mobile communication device is stationary or is moving at a low enough speed, it is examined in decision 230 how the RSRP/RSRQ information of the first cell (i.e. the current serving cell) compares with configurable values. The nature of such comparison varies based on whether the current serving cell has a higher priority than the potential target cell. Specifically, if the current serving cell has a higher priority than the potential target cell, the comparison involves a determination whether the RSRP/RSRQ of the serving cell is worse than a configurable value and is worse than a threshold of RSRP/RSRQ of a reselection target cell for a period of time. On the other hand, if the current serving cell has a lower priority than the potential target cell, the comparison involves a determination whether its RSRP/RSRQ information is better than a threshold of RSRP/RSRQ of a reselection target cell on a higher priority frequency for a period of time and whether RSRP/RSRQ information of the potential target cell is worse than the configurable value for a period of time.

To this end, decision 230 provides priority-agnostic insight into the relative quality of service of the current serving cell, as compared to the potential target cell. By this design, reselection (and subsequent handover, etc.) may be avoided in certain circumstances. More information regarding the decision 230 will be set forth during the description of FIG. 3.

With continuing reference to FIG. 2, a frequency de-prioritization process is initiated, if both decision 226 and decision 230 are decided in the affirmative. See step 232.

This results in de-prioritization of the higher priority frequency to the same priority level as the lower priority frequency. To this end, reselection is avoided since the target serving cell does not have a higher priority as compared to the current serving cell.

As shown, the method 200 loops so as to continuously re-check decisions 226, 230 such that reselection (and subsequent handover) may again ensue when either the mobile communication devices exhibits a threshold speed and/or does not meet the signal quality criteria set forth above. If such occurs, the aforementioned de-prioritization may be cleared (and the impact of the first particular technique reversed), so that normal reselection to the target cell may occur. Until such happens, however, any connection request by the mobile communication device results in a switch between the idle and connected mode states while the mobile communication device remains to be serviced by the current serving cell (see, again, steps 214-216).

Figure 3:
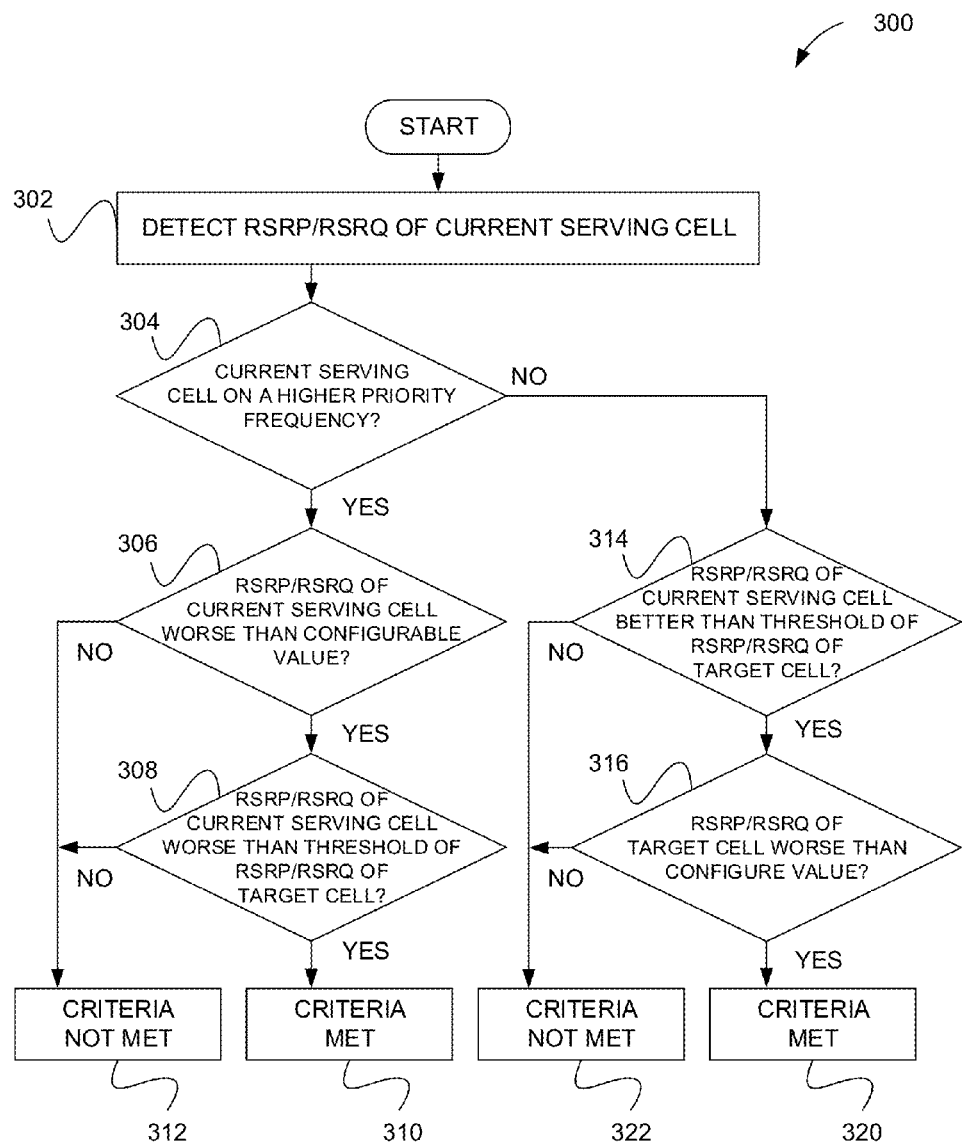
FIG. 3 illustrates a method for determining whether reselection avoidance criteria is met per step 230 of FIG. 2, in accordance with yet another embodiment.

FIG. 3 illustrates a method 300 determining whether reselection avoidance criteria is met per step 230 of FIG. 2, in accordance with yet another embodiment. As shown, RSRP/RSRQ information is detected in step 302 for the current serving cell (e.g. the cell referenced in step 314-316 in FIG. 3, etc.), for use during subsequent determinations. Further, it is determined whether the current serving cell and its frequency have a higher priority, as compared to a potential target cell. See decision 304. Based on decision 304, a number of other determinations are then made.

Specifically, if it is determined that the current serving cell and its frequency have a higher priority than the potential target cell, it is first determined whether RSRP/RSRQ information of the current serving cell is worse than a configurable value, per decision 306. Such value may be configurable by the mobile communication device, the network, and/or any other entity, for controlling the sensitivity with which the particular reselection avoidance technique is initiated. Further, it is then determined whether the RSRP/RSRQ information of the current serving cell is worse than RSRP/RSRQ information of the potential target cell (e.g. by a predetermined threshold, etc.), per decision 308. If both decisions 306 and 308 are decided in the affirmative, it is determined that the necessary criteria is met for reselection avoidance. See step 310. If not, reselection to the target cell is performed, per step 312.

On the other hand, if it is determined that the current serving cell and its frequency have a lower priority than the potential target cell, it is first determined whether the RSRP/RSRQ information of the current serving cell is better than RSRP/RSRQ information of the potential target cell (e.g. by a predetermined threshold, etc.), per decision 314. Further, it is then determined whether RSRP/RSRQ information of the potential target cell is worse than the configurable value, per decision 316. Again, such value may be configurable by the mobile communication device, the network, and/or any other entity, for controlling the sensitivity with which the particular reselection avoidance technique is initiated. Further, if both decisions 314 and 316 are decided in the affirmative, it is determined that the necessary criteria is met for reselection avoidance. See step 320. If not, reselection to the target cell is performed, per step 322.

While not shown, some or all of the decisions 306, 308, 314, and 316 may also determine whether the relevant criteria is met for a predetermined amount of time. If not, each relevant decision 306, 308, 314, and 316 may result in a negative result, resulting in the ultimate criteria (to prompt reselection avoidance) not being met (per steps 312, 322).

By this design, the foregoing logic permits priority-agnostic/quality-centric logic to dictate whether reselection occurs, instead of simply progressing with reselection based only on the priority of cells each time the mobile communication device switches from a connected mode state to an idle mode state. Further, by avoiding the reselection in such circumstances, subsequent handover is also avoided when the mobile communication device switches back to the connected mode state from the idle mode state. Thus, cell measurements, reports, and commands that are otherwise required to effect such unnecessary reselection and handover may be avoided, to conserve resources on part of the network (in the form of network signaling overhead) and on part of the mobile communication device (in the form of battery power).

Figure 4:
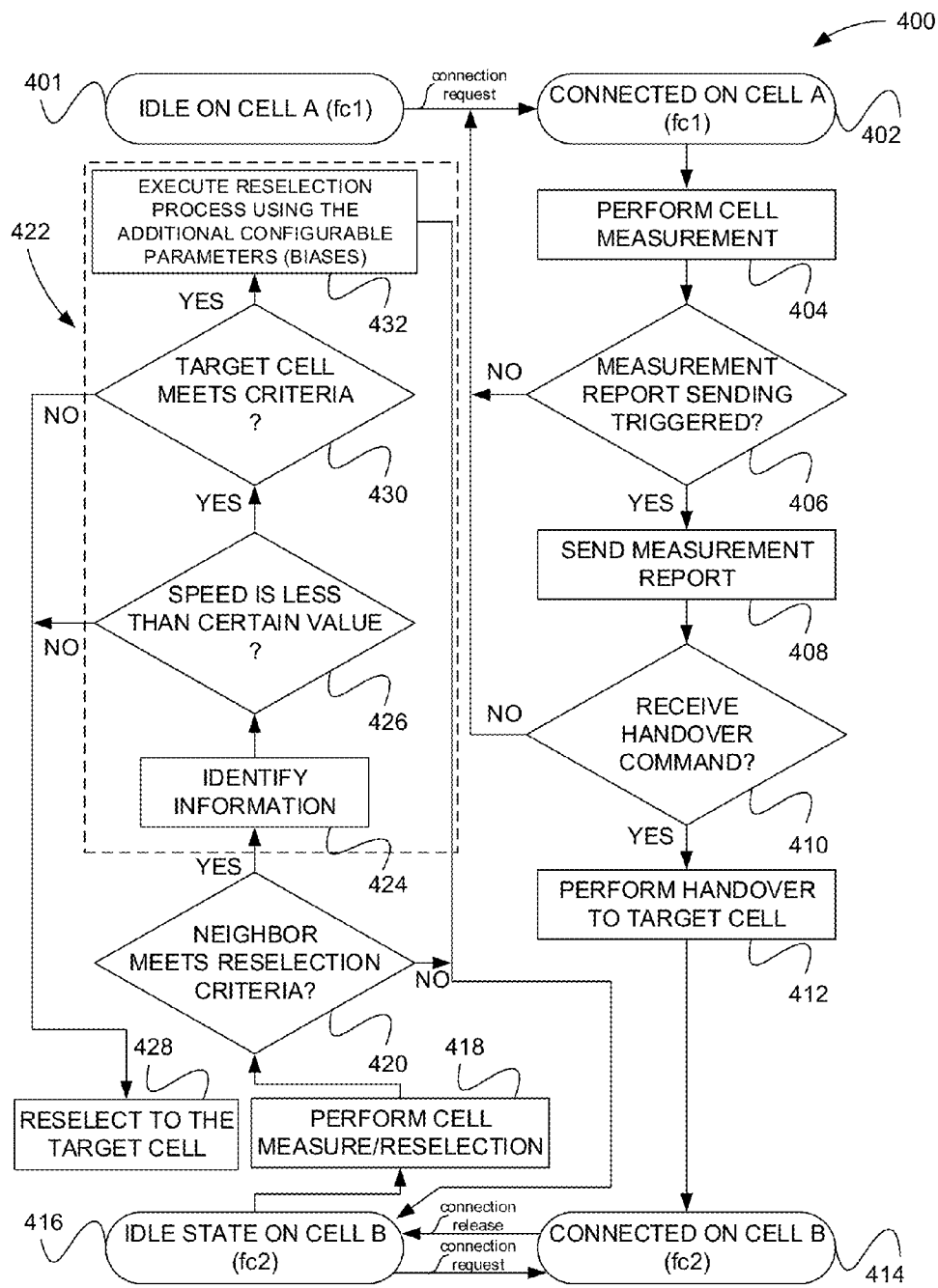
FIG. 4 illustrates a method for criteria-based conditional cell reselection to a cell on a higher priority frequency utilizing a second particular technique, in accordance with yet another embodiment.

FIG. 4 illustrates a method 400 for criteria-based conditional cell reselection to a cell on a higher priority frequency utilizing a second particular technique, in accordance with yet another embodiment. Similar to the method 200 of FIG. 2, the method 400 may be implemented with any feature(s) of any one or more of the embodiments set forth in any previous and/or subsequent figure(s) and/or the description thereof. However, it is to be appreciated that the method 400 may be implemented in the context of any desired environment.

Similar to the method 200 of FIG. 2, the method 400 includes multiple steps 401, 402, 404, 406, 408, 410, 412, 414, 416, 418, 420, 424 426, 428, and 430, that correlate with steps 201, 202, 204, 206, 208, 210, 212, 214, 216, 218, 220, 224, 226, 228, and 230, respectively (and are thus incorporated herein by reference). However, as shown in step 432, the method 400 utilizes a different particular technique to avoid the reselection of step 428.

Specifically, as shown in step 432, additional configurable parameters may be utilized during the reselection process so as to bias such process against reselection. This may involve raising or lowering the relevant thresholds and/or time requirements so that the reselection avoidance process is less likely to be triggered. In various embodiments, such parameters may be configured by the mobile communication device and/or by the network and then communicated to the mobile communication device. Further, such parameters may include any or all of those that are used during step 230 of FIG. 2 and decisions 314 and 316 of FIG. 3. By biasing such parameters, reselection is less likely to occur. To this end, these parameters effectively "soften" the use of priorities in the reselection procedure, as opposed to incorporating a binary decision where the device decides to ignore them, thus, placing such degree of "softening" under the control of the network service provider.

As an example, in one embodiment involving an Evolved UMTS Terrestrial Radio Access Network (E-UTRAN), a new information element may be defined to contain the newly defined parameters, and the new information element may be added to IE SystemInformationBlockType5, which is one of the types of system information a base station broadcasts, as mandated in the 3GPP specification. The IE SystemInformationBlockType5 contains information relevant for inter-frequency cell re-selection i.e. information about other E-UTRA frequencies and inter-frequency neighboring cells relevant for cell re-selection). The IE includes cell re-selection parameters that are common for a frequency as well as cell-specific re-selection parameters. In another embodiment, the new information element may be added to a eNodeBRRCConnectionReleasemessage. A mobile communication device can thus receive the biased values of the newly-defined parameters via eNodeBbroadcasts or a RRC-ConnectionReleasemessage.

As shown, the method 400 loops so as to continuously re-check decisions 426, 430 so that reselection (and subsequent handover) may again ensue when either the mobile communication devices exhibits a threshold speed and/or does not meet the signal quality criteria set forth above. If such occurs, the aforementioned bias of the parameters may be reverted or simply no longer used (and the impact of the second particular technique reversed), so that normal reselection to the target cell may occur. Until such happens, however, any connection request by the mobile communication device results in a switch between the idle and connection states while the mobile communication device remains to be serviced by the current serving cell (see steps 414-416).

Figure 5:
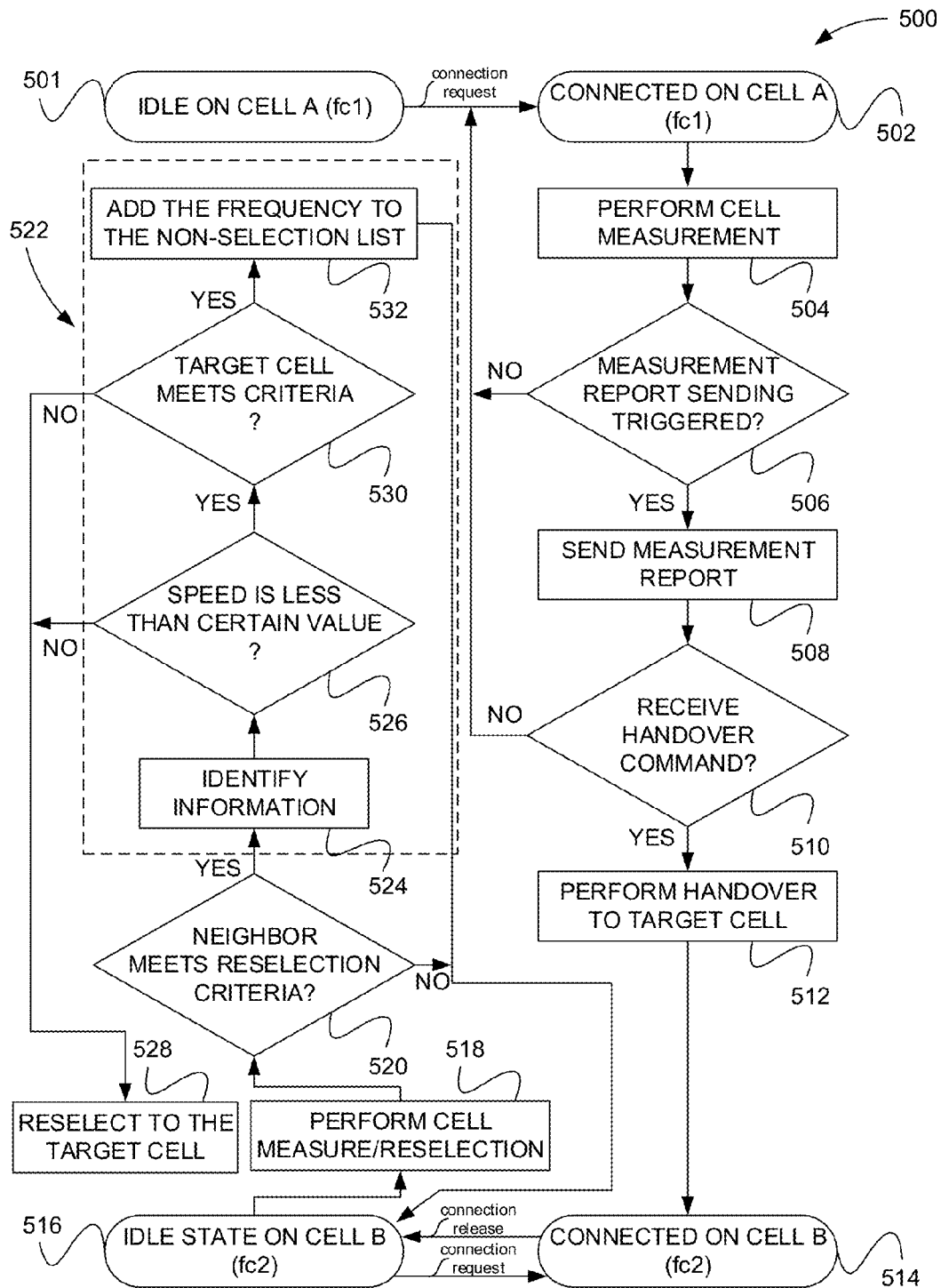
FIG. 5 illustrates a method for criteria-based conditional cell reselection to a cell on a higher priority frequency utilizing a third particular technique, in accordance with yet another embodiment.

FIG. 5 illustrates a method 500 for criteria-based conditional cell reselection to a cell on a higher priority frequency utilizing a third particular technique, in accordance with yet another embodiment. Similar to the methods 200/300 of FIGS. 2/3, the method 500 may be implemented with any feature(s) of any one or more of the embodiments set forth in any previous and/or subsequent figure(s) and/or the description thereof. However, it is to be appreciated that the method 500 may be implemented in the context of any desired environment.

Similar to the method 200 of FIG. 2, the method 500 includes multiple steps 501, 502, 504, 506, 508, 510, 512, 514, 516, 518, 520, 524, 526, 528, and 530, that correlate with steps 201, 202, 204, 206, 208, 210, 212, 214, 216, 218, 220, 224, 226, 228, and 240, respectively (and are thus incorporated herein by reference). However, as shown in step 532, the method 500 utilizes a different particular technique to avoid the reselection of step 528.

In particular, as shown in step 532, the frequency of the target cell may be added to a non-reselection list to prevent reselection to such cell. Such may thus operate as a blacklist, thereby preventing reselection altogether. Similar to the previous embodiments, the present technique may be administered by the network or the mobile communication device.

As shown, the method 500 loops so as to continuously re-check decisions 526, 530 so that reselection (and subsequent handover) may again ensue when either the mobile communication devices exhibits a threshold speed and/or does not meet the signal quality criteria set forth above. If such occurs, the frequency of the aforementioned target cell may be removed from the non-reselection list (and the impact of the third particular technique reversed), so that normal reselection to the target cell may occur. Until such happens, however, any connection request by the mobile communication device results in a switch between the idle and connection states while the mobile communication device remains to be serviced by the current serving cell (see steps 514-516).

Figure 6A:
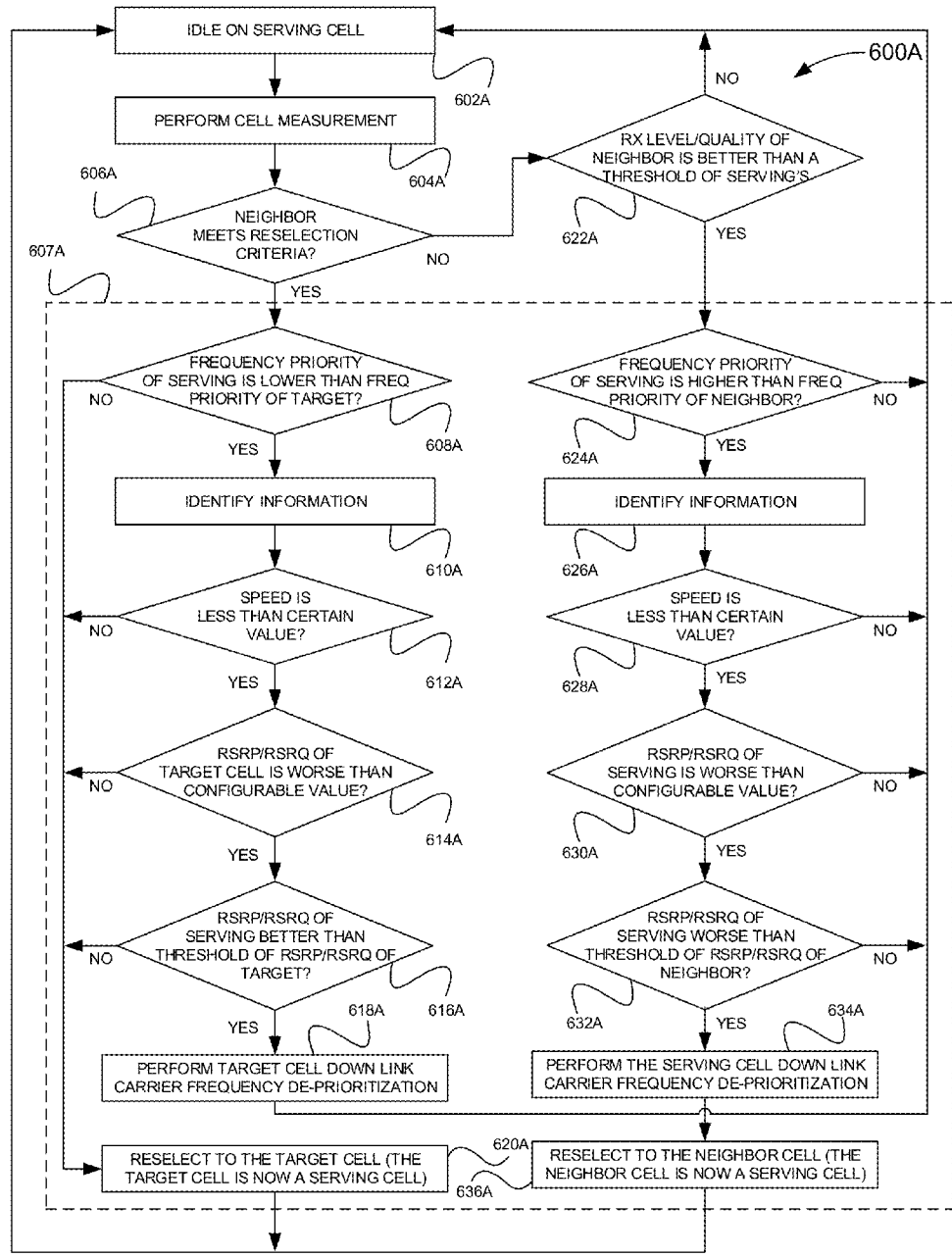
FIG. 6A illustrates a method for criteria-based conditional cell reselection utilizing a first particular technique, in accordance with yet another embodiment.

FIG. 6A illustrates a method 600A for criteria-based conditional cell reselection utilizing a first particular technique, in accordance with yet another embodiment. As an option, the method 600A may be implemented with any feature(s) of any one or more of the embodiments set forth in any previous and/or subsequent figure(s) and/or the description thereof. However, it is to be appreciated that the method 600A may be implemented in the context of any desired environment.

As shown in step 602A, the method 600A begins with a mobile communication device in an idle mode state that is being serviced by a first cell that is operating on a first frequency with a first priority assignment. Next, cell measurements are performed in step 604A. Such cell measurements involve the receipt of reference signals from one or more other cells and generating measurement information in the form of RSRP and/or RSRQ information.

With continuing reference to FIG. 6A, the mobile communication device determines whether any neighboring cell meets reselection criteria. See decision 606A. In one embodiment, such reselection criteria may involve the identification of another target cell (e.g. the first cell or some other similar cell, etc.) that has a different priority assignment. Thereafter, the method 600A initiates a reselection avoidance process 607A.

Specifically, it is determined whether the priority of the frequency of the current serving cell is lower than the priority of the frequency of a potential target cell. See decision 608A. If yes, a number of other determinations are then made based on information identified in step 610A. Such information may include, but is not limited to a speed of the mobile communication device, and RSRP/RSRQ information, for evaluating whether reselection avoidance is warranted.

Specifically, it is determined, in decision 612A, whether the speed identified in step 610A is less than a certain value. Specifically, decision 612A determines whether the mobile communication device is stationary or is moving at a low enough speed to allow for the reselection to be avoided. If so, the method 600A continues with additional decisions, as shown As shown, it is first determined whether RSRP/RSRQ information of the potential target cell is worse than a configurable value, per decision 614A. Such value may be configurable by the mobile communication device, the network, and/or any other entity, for controlling the sensitivity with which the particular reselection avoidance technique is initiated. Further, it is then determined whether the RSRP/RSRQ information of the current serving cell is better than RSRP/RSRQ information of the potential target cell (e.g. by a predetermined threshold, etc.), per decision 616A. If both decisions 614A and 616A are decided in the affirmative, the target cell down link carrier frequency is de-prioritized in step 618A. Such de-prioritization results in de-prioritization of the higher priority frequency to the same priority level as the lower priority frequency. To this end, reselection is avoided.

On the other hand, if in step 606A, it is determined that there is no neighboring cell that meets reselection criteria, it is determined in decision 622A whether the receiver (RX) level/quality of a neighboring cell is better than a threshold of the RX level/quality of the serving cell. If so, the method 600A continues with additional decisions, as shown, and the neighboring cell is a selected as the potential target cell.

Specifically, it is determined whether the priority of the frequency of the current serving cell is higher than the priority of the frequency of the selected potential target cell. See decision 624A. If yes, a number of other determinations are then made based on information identified in step 626A. Such information may include, but is not limited to a speed of the mobile communication device, and RSRP/RSRQ information, for evaluating whether reselection avoidance is warranted.

Specifically, it is determined, in decision 628A, whether the speed identified in step 626A is less than a certain value. Specifically, decision 628A determines whether the mobile communication device is stationary or is moving at a low enough speed to allow for the reselection to be avoided. If so, it continues with the following additional decisions, as shown.

It is first determined whether RSRP/RSRQ information of the serving cell is worse than a configurable value, per decision 630A. Such value may be configurable by the mobile communication device, the network, and/or any other entity, for controlling the sensitivity with which the particular reselection avoidance technique is initiated. Further, it is then determined whether the RSRP/RSRQ information of the current serving cell is worse than RSRP/RSRQ information of the selected target cell (e.g. by a predetermined threshold, etc.), per decision 632A. If both decision 630A and 632A are decided in the affirmative, the serving cell down link carrier frequency is de-prioritized in step 634A. To this end, the cell reselection to a cell on a lower priority frequency happens in step 636A. The criteria-based conditional cell reselection avoids the ping-pong cell reselection/handover loop between a mobile communication device idle mode state and connected mode state.

As shown, the method 600A loops so as to continuously re-check decisions 612A, 614A, 616A, 628A, 630A, and 632A so that reselection (and subsequent handover) may again ensue when either the mobile communication device exhibits a threshold speed and/or does not meet the signal quality criteria set forth above. If such occurs, the designated frequency may be removed from the non-reselection list (and the impact of the present particular technique reversed), so that normal reselection to the target cell may occur.

While not shown, some or all of the decisions 612A, 614A, 616A, 628A, 630A, and 632A may also determine whether the relevant criteria is met for a predetermined amount of time. If not, each of the relevant decisions 612A, 614A, 616A, 628A, 630A, and 632A may result in a negative result, resulting in the ultimate criteria (to prompt reselection avoidance) not being met.

In any case, if the decision 608A is determined in the negative and/or any of the decisions 612A, 614A, and 616A are determined in the negative, reselection is caused to the target cell. See step 620A. If the decision 624A is determined in the negative and/or any of the decisions 628A, 630A, and 632A are determined in the negative, then no cell reselection happens.

By this design, reselection is avoided under certain circumstances to conserve resources on part of the network (in the form of network signaling overhead) and on part of the mobile communication device (in the form of battery power).

Figure 6B:
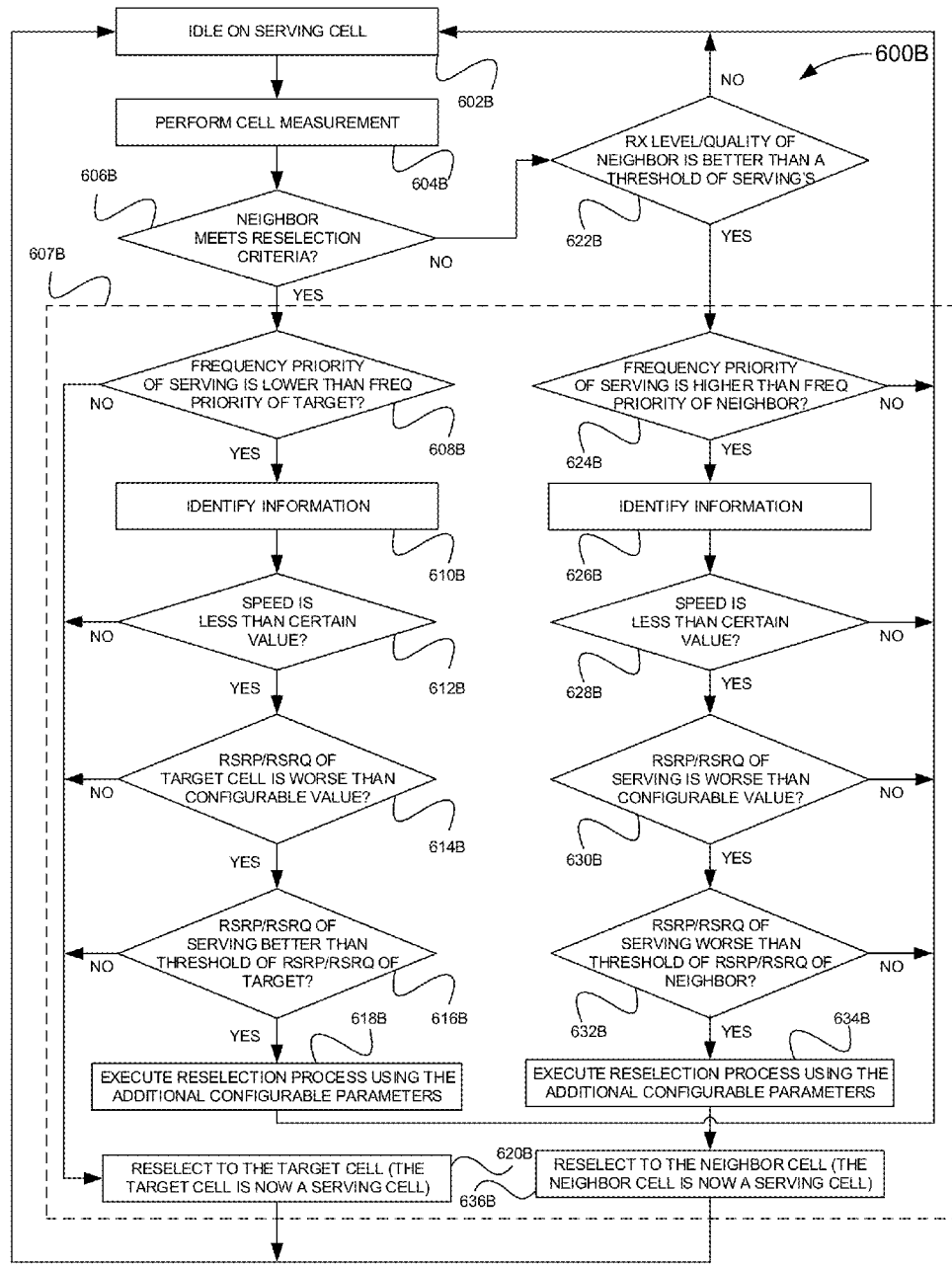
FIG. 6B illustrates a method for criteria-based conditional cell reselection utilizing a second particular technique, in accordance with still yet another embodiment.

FIG. 6B illustrates a method 600B for criteria-based conditional cell reselection utilizing a second particular technique, in accordance with still yet another embodiment. As an option, the method 600B may be implemented with any feature(s) of any one or more of the embodiments set forth in any previous and/or subsequent figure(s) and/or the description thereof. However, it is to be appreciated that the method 600B may be implemented in the context of any desired environment.

Similar to the method 600A of FIG. 6A, the method 600B includes multiple steps/decisions 602B, 604B, 606B, 607B, 608B, 610B, 612B, 614B, 616B, 620B, 622B, 624B, 626B, 626B, 628B, 630B, 632B, and 636B, that correlate with steps/decisions 602A, 604A, 606A, 607A, 608A, 610A, 612A, 614A, 616A, 620A, 622A, 624A, 626A, 626A, 628A, 630A, 632A, and 636A respectively (and are thus incorporated herein by reference). However, as shown in steps 618B and 634B, the method 600B utilizes a different particular technique to avoid the ping-pong cell reselection/handover loop between a mobile communication device idle mode state and connected mode state.

In particular, as shown in step 618B and 634B, additional configurable parameters may be utilized during the reselection process so as to bias such process against reselection. This may involve raising or lowering the relevant thresholds and/or time requirements so that the ping-pong cell reselection/handover loop between a mobile communication device idle mode state and connected mode state can be avoided. In various embodiments, such parameters may be configured by the mobile communication device and/or by the network and then communicated to the mobile communication device.

By biasing such parameters, reselection is less likely to occur. To this end, these parameters effectively "soften" the use of priorities in the reselection procedure, as opposed to incorporating a binary decision where the device decides to ignore them, thus, placing such degree of "softening" under the control of the network service provider.

As shown, the method 600B loops so as to continuously re-check decisions 612B, 614B, 616B, or 628B, 630B, 632B so that reselection (and subsequent handover) may again ensue when either the mobile communication devices exhibits a threshold speed and/or does not meet the signal quality criteria set forth above. If such occurs, the designated frequency may be removed from the non-reselection list (and the impact of the present particular technique reversed), so that normal reselection to the target cell may occur.

Figure 6C:
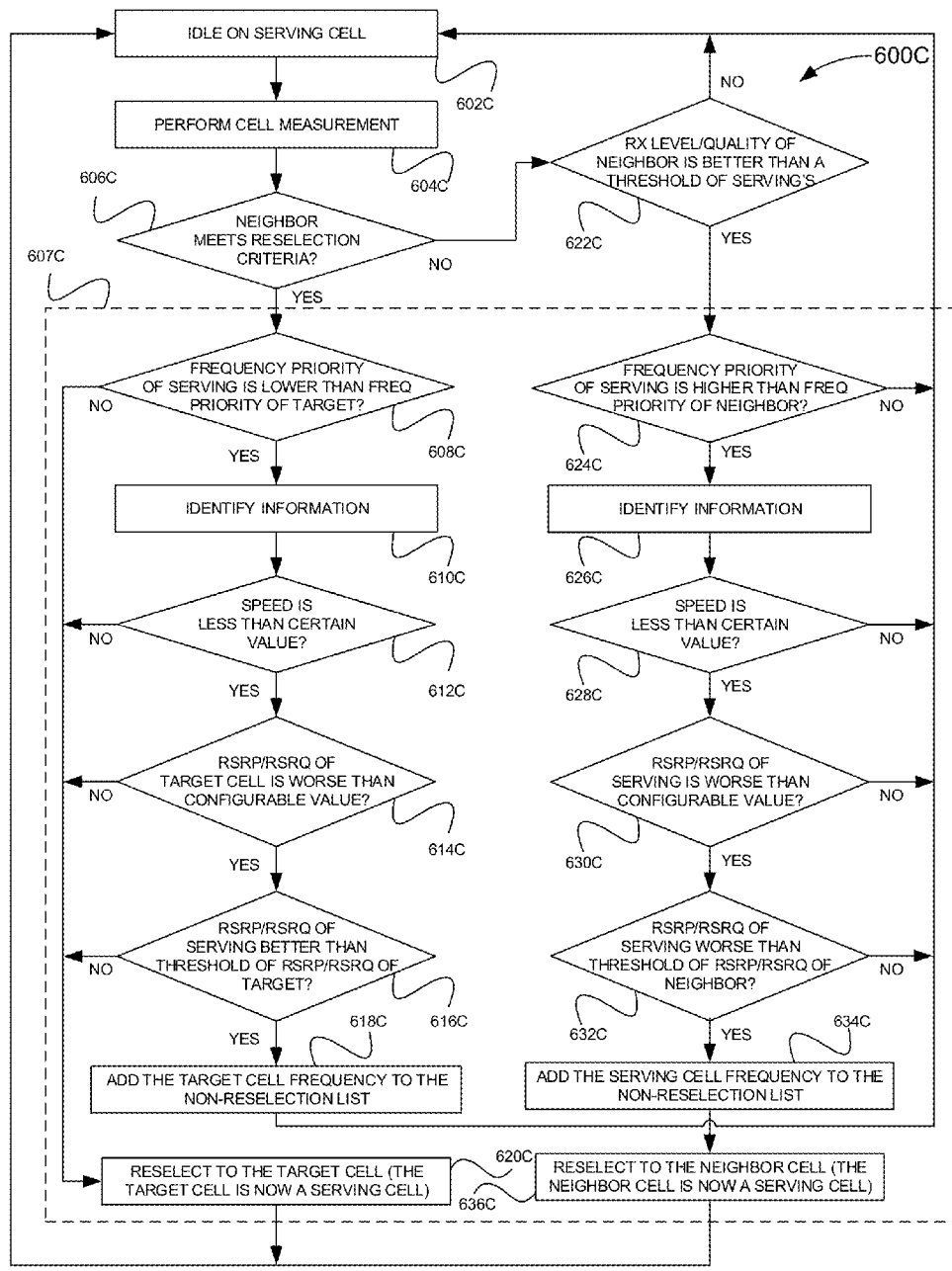
FIG. 6C illustrates a method for criteria-based conditional cell reselection utilizing a third particular technique, in accordance with even still yet another embodiment.

FIG. 6C illustrates a method 600C for criteria-based conditional cell reselection utilizing a third particular technique, in accordance with still yet another embodiment. As an option, the method 600C may be implemented with any feature(s) of any one or more of the embodiments set forth in any previous and/or subsequent figure(s) and/or the description thereof. However, it is to be appreciated that the method 600C may be implemented in the context of any desired environment.

Similar to the method 600A/B of FIG. 6A/B, the method 600C includes multiple steps/decisions 602C, 604C, 606C, 607C, 608C, 610C, 612C, 614C, 616C, 620C, 622C, 624C, 626C, 626C, 628C, 630C, 632C, and 636C, that correlate with steps/decisions 602A/B, 604A/B, 606A/B, 607A/B, 608A/B, 610A/B, 612A/B, 614A/B, 616A/B, 620A/B, 622A/B, 624A/B, 626A/B, 626A/B, 628A/B, 630A/B, 632A/B, and 636A/B respectively (and are thus incorporated herein by reference). However, as shown in steps 618C and 634C, the method 600C utilizes a different particular technique to avoid the ping-pong cell reselection/handover loop between a mobile communication device idle mode state and connected mode state In particular, as shown in step 618C, the frequency of the target cell may be added to a non-reselection list to prevent reselection. Such may thus operate as a blacklist, thereby preventing reselection altogether. Similar to the previous embodiments, the present technique may be administered by the network or the mobile communication device. Similarly, as shown in step 634C, the frequency of the serving cell may be added to a non-reselection list, again, to prevent the ping-pong cell reselection/handover loop between a mobile communication device idle mode state and connected mode state.

As shown, the method 600C loops so as to continuously re-check decisions 612C, 614C, 616C, or 628C, 630C, 632C so that reselection (and subsequent handover) may again ensue when either the mobile communication devices exhibits a threshold speed and/or does not meet the signal quality criteria set forth above. If such occurs, the designated frequency may be removed from the non-reselection list (and the impact of the present particular technique reversed), so that normal reselection to the target cell may occur.

Figure 6D:
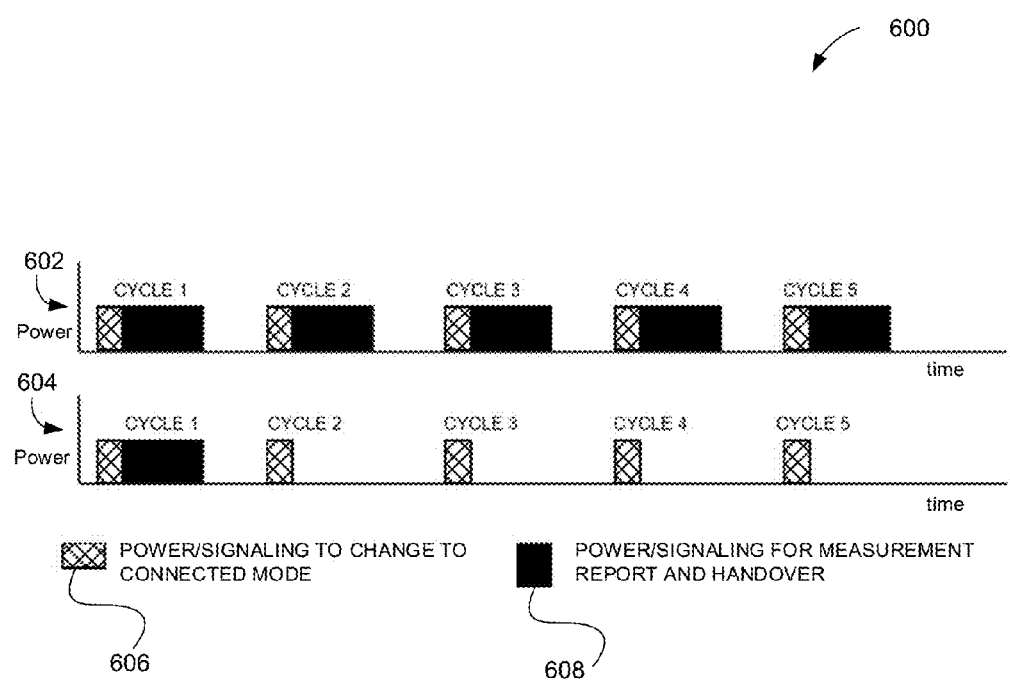
FIG. 6D illustrates plots showing potential power/signaling savings on a mobile communication device that may result from implementing any of the particular techniques disclosed herein, in accordance with one embodiment.

FIG. 6D illustrates plots 600 showing potential power/signaling savings on a mobile communication device that may result from implementing any of the particular techniques disclosed herein, in accordance with one embodiment. As shown, a first plot 602 shows power/signaling amounts without use of any of the particular techniques disclosed herein, while a second plot 604 shows power/signaling amounts while using any of the particular techniques disclosed herein. Further, the first plot 602 requires a first amount of power/signaling 606 to switch a mobile communication device to a connected mode, a second amount of power/signaling 608 for measurement reporting, performing a handover, releasing a connection to idle mode, and reselecting a high priority cell, for each cycle.

As set forth earlier, each cycle includes a switch from an idle mode state to a connected mode state and associated handover, followed by a switch from the connected mode state to the idle mode state, and associated reselection. In contrast, in the second plot 604, such power/signaling is only required for the first cycle after which the second amount of power/signaling 608 is avoided, by virtue of avoiding the reselection (and therefore the subsequent handover and accompanying measurements, etc.). Of course, these potential power/signaling savings are set forth for illustrative purposes only and should be not construed as limiting in any manner.

Figure 7:
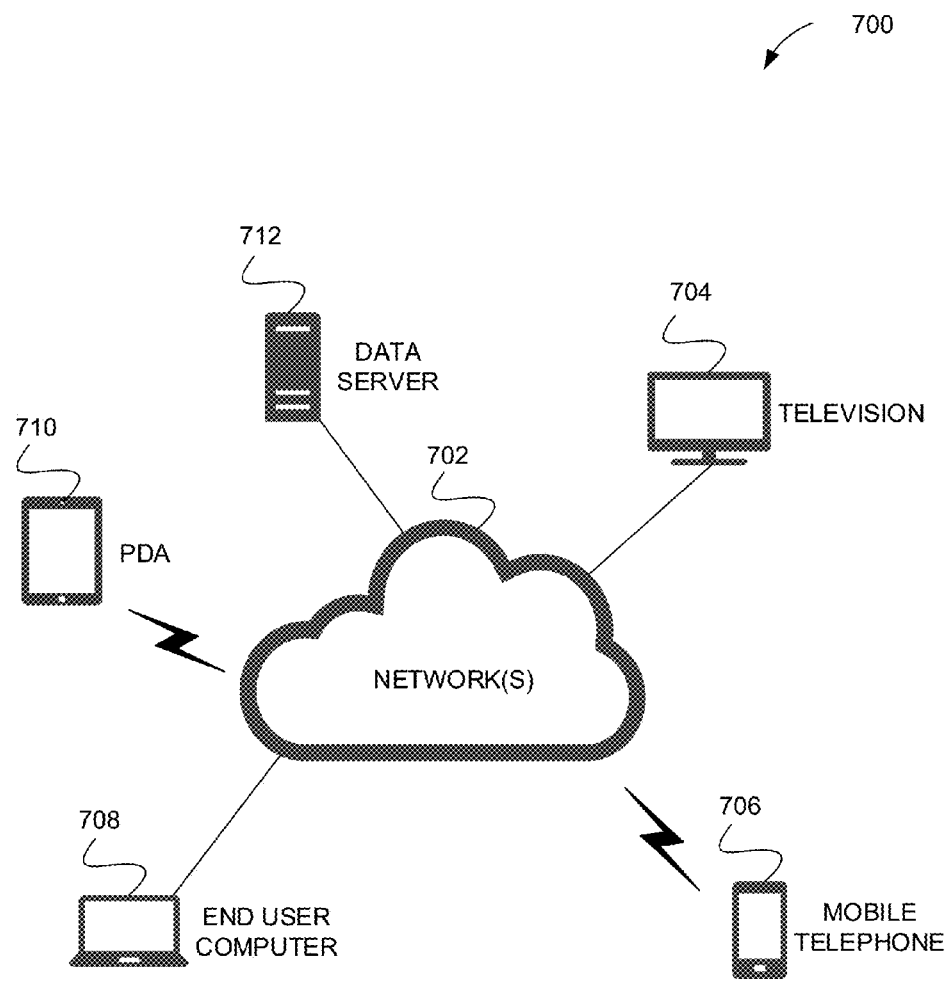
FIG. 7 illustrates a network architecture, in accordance with one embodiment.

FIG. 7 illustrates a network architecture 700, in accordance with one embodiment. In one embodiment, one or more of the features disclosed hereinabove may or may not be implemented in the context of the present network architecture 700.

As shown, at least one network 702 is provided. In the context of the present network architecture 700, the network 702 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 702 may be provided.

Coupled to the network 702 is a plurality of devices. For example, a server computer 712 and an end user computer 708 may be coupled to the network 702 for communication purposes. Such end user computer 708 may include a desktop computer, lap-top computer, and/or any other type of logic. Still yet, various other devices may be coupled to the network 702 including a personal digital assistant (PDA) device 710, a mobile phone device 706, a television 704, etc.

Figure 8:
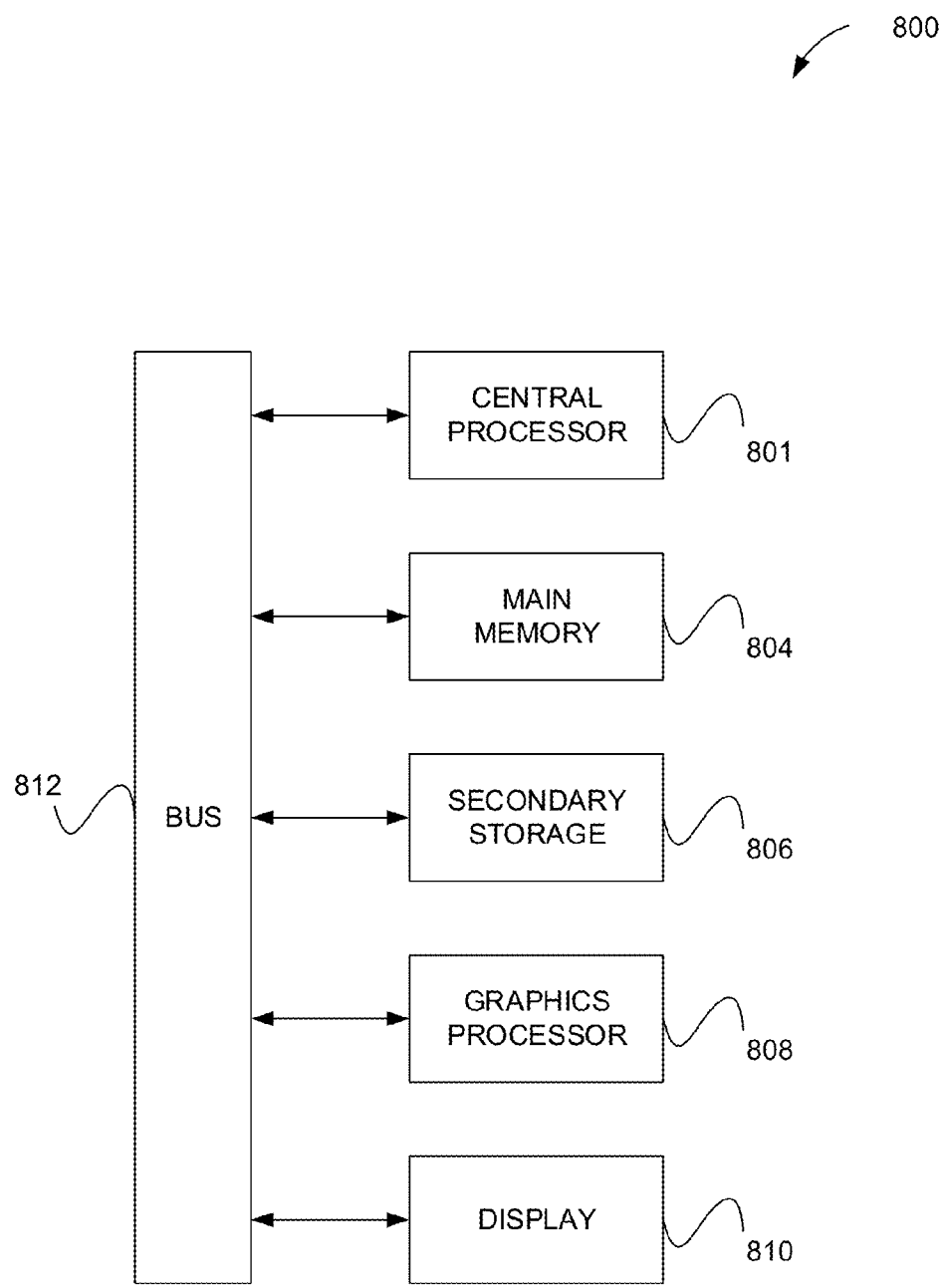
FIG. 8 illustrates an exemplary system, in accordance with one embodiment.

FIG. 8 illustrates an exemplary system 800, in accordance with one embodiment. As an option, the system 800 may be implemented in the context of any of the devices of the network architecture 700 of FIG. 7. However, it is to be appreciated that the system 800 may be implemented in any desired environment.

As shown, a system 800 is provided including at least one central processor 801 which is connected to a bus 812. The system 800 also includes main memory 804 [e.g., hard disk drive, solid state drive, random access memory (RAM), etc.]. The system 800 also includes a graphics processor 808 and a display 810.

The system 800 may also include a secondary storage 806. The secondary storage 806 includes, for example, a hard disk drive and/or a removable storage drive, representing a floppy disk drive, a magnetic tape drive, a compact disk drive, etc. The removable storage drive reads from and/or writes to a removable storage unit in a well-known manner.

Computer programs, or computer control logic algorithms, may be stored in the main memory 804, the secondary storage 806, and/or any other memory, for that matter. Such computer programs, when executed, enable the system 800 to perform various functions (as set forth above, for example). Memory 804, secondary storage 806 and/or any other storage are possible examples of tangible computer-readable media.

It is noted that the techniques described herein, in an aspect, are embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media are included which may store data that is accessible by a computer, such as magnetic cassettes, flash memory cards, digital video disks, Bernoulli cartridges, random access memory (RAM), read-only memory (ROM), and the like.

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that various of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein include the one or more modes known to the inventor for carrying out the claimed subject matter. It is to be appreciated that variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A method, comprising:
identifying information in connection with a mobile communication device being serviced by a first cell of a network utilizing a first frequency with a first priority, the information including first information associated with a speed and second information associated with a reference signal received power (RSRP) or a reference signal received quality (RSRQ) in connection with one or more cells of the network;
performing a first determination as to whether the first information meets one or more first criteria;
conditionally performing a second determination, based on the first determination, the second determination determining as to whether the second information meets one or more second criteria including:
whether a first portion of the second information associated with a second cell of the network is worse than a configurable value, the second cell utilizing a second frequency with a second priority, and
whether a second portion of the second information associated with the first cell is better than a threshold; and
conditionally causing reselection for the mobile communication device in connection with the second cell, based on the first determination and the second determination.

2. The method of claim 1, wherein the speed of the first information is related to a movement of the mobile communication device.

3. The method of claim 2, wherein the one or more first criteria involves a speed-related threshold, and the first determination determines whether the first information exceeds the speed-related threshold.

4. The method of claim 1, wherein the second information is associated with the reference signal received power (RSRP) and the reference signal received quality (RSRQ).

5. The method of claim 1, wherein the one or more cells include the first cell of the network.

6. The method of claim 1, wherein the one or more cells include the second cell of the network.

7. The method of claim 1, wherein the threshold is a configurable threshold.

8. The method of claim 1, wherein the one or more second criteria involves at least one of a RSRP threshold or a RSRQ threshold, and the second determination determines whether the second information crosses the at least one of the RSRP threshold or the RSRQ threshold.

9. The method of claim 1, wherein the second determination involves a comparison between the RSRP or the RSRQ in connection with the first cell of the network, and the RSRP or the RSRQ in connection with the second cell of the network.

10. The method of claim 1, wherein the second determination determines whether the second information meets the one or more second criteria for a minimum amount of time.

11. The method of claim 1, wherein the one or more first criteria or the one or more second criteria is configured by the mobile communication device.

12. The method of claim 1, wherein the one or more first criteria or the one or more second criteria is configured by the network.

13. The method of claim 1, wherein the reselection is conditionally caused, utilizing a particular technique.

14. The method of claim 13, wherein the particular technique involves changing at least one of the first priority of the first frequency or the second priority of the second frequency, based on the first determination and the second determination.

15. The method of claim 13, wherein the particular technique involves adjusting at least one parameter that controls whether the reselection is conditionally caused.

16. The method of claim 13, wherein the particular technique involves adding the second frequency utilized by the second cell to a non-reselection list.

17. The method of claim 13, and further comprising reversing an effect of the particular technique.

18. The method of claim 1, wherein the reselection is caused by at least one of the mobile communication device, or the network.

19. An apparatus, comprising:
a mobile communication device including at least one hardware processor configured for:
identifying information in connection with the mobile communication device while being serviced by a first cell of a network utilizing a first frequency with a first priority, the information including first information associated with a speed and second information associated with a reference signal received power (RSRP) or a reference signal received quality (RSRQ) in connection with one or more cells of the network;
performing a first determination as to whether the first information meets one or more first criteria;
conditionally performing a second determination, based on the first determination, the second determination determining as to whether the second information meets one or more second criteria including:
whether a first portion of the second information associated with a second cell of the network is worse than a configurable value, the second cell utilizing a second frequency with a second priority, and
whether a second portion of the second information associated with the first cell is better than a threshold; and
conditionally causing reselection for the mobile communication device in connection with the second cell, based on the first determination and the second determination.

20. A computer program product comprising computer executable instructions stored on a non-transitory computer readable medium that when executed by a processor instruct the processor to:
identify information in connection with a mobile communication device operating on a first cell of a network utilizing a first frequency with a first priority, the information including first information associated with a speed and second information associated with a reference signal received power (RSRP) or a reference signal received quality (RSRQ) in connection with one or more cells of the network;

perform a first determination as to whether the first information meets one or more first criteria;

conditionally perform a second determination, based on the first determination, the second determination determining as to whether the second information meets one or more second criteria including:

whether a first portion of the second information associated with a second cell of the network is worse than a configurable value, the second cell utilizing a second frequency with a second priority, and whether a second portion of the second information associated with the first cell is better than a threshold; and conditionally cause reselection for the mobile communication device in connection with the second cell, based on the first determination and the second determination.

21. The method of claim 1, wherein the second determination includes a determination as to whether the first portion of the second information associated with the second cell is worse than a particular criteria of the one or more second criteria which is the configurable value, and a determination as to whether the second portion of the second information associated with the first cell is better than another particular criteria of the one or more second criteria which is the threshold.

22. The method of claim 1, and further comprising determining whether the first priority is lower than the second priority, and performing the second determination if the first priority is lower than the second priority.

* * * * *